April 9, 1957  C. O. MUSSER  2,787,929
BELLS
Filed Feb. 4, 1954  2 Sheets-Sheet 1
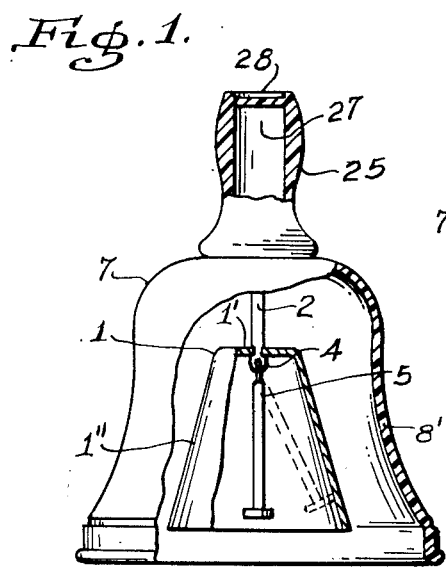
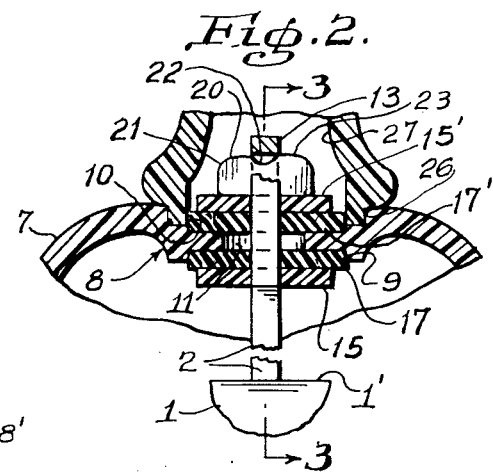
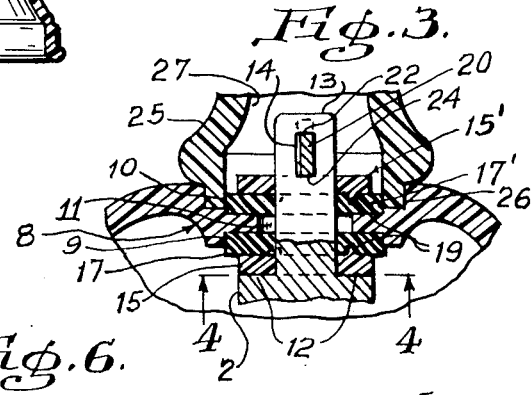
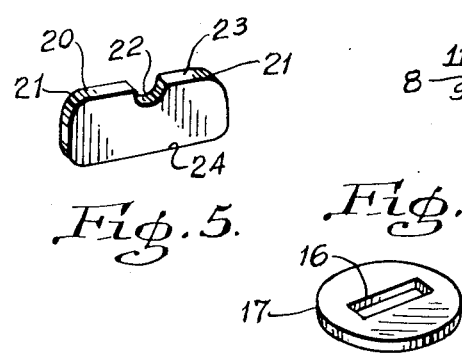
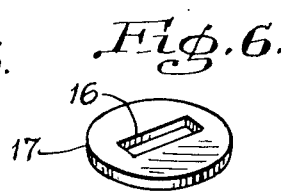
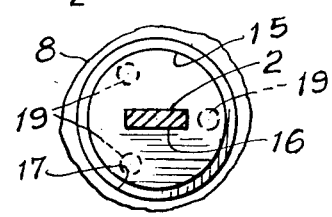
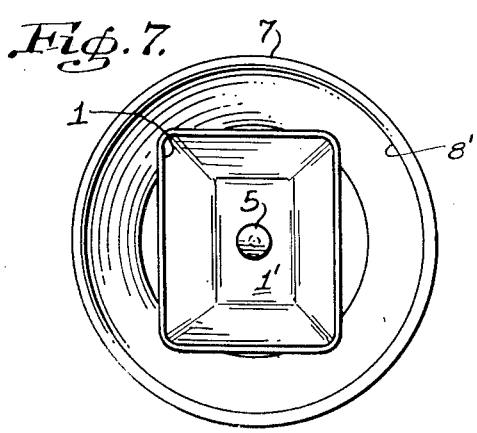
INVENTOR.
CLAIR O. MUSSER
BY
ATTORNEY.

April 9, 1957   C. O. MUSSER   2,787,929
BELLS

Filed Feb. 4, 1954   2 Sheets-Sheet 2

INVENTOR.
CLAIR O. MUSSER
BY
ATTORNEY.

United States Patent Office 2,787,929
Patented Apr. 9, 1957

2,787,929

BELLS

Clair O. Musser, Los Angeles, Calif.

Application February 4, 1954, Serial No. 408,109

15 Claims. (Cl. 84—406)

This invention relates to bells and particularly to sound amplifiers and resonators for bell mountings.

It is an object of my invention to mount bells in an outer casing. It is a further object of my invention to employ said outer casing as a sound amplifying or resonating chamber. In a preferred embodiment it is an object of my invention to shape the outer casing in a bell shape.

It is a further object of my invention to mount bells in an ornamental bell-shaped casing.

It is also an object of my invention to acoustically isolate the casing from the inner bell in order to minimize or effectively eliminate the transmission of vibrations from the inner bell to the outer casing.

It is a further object of my invention to mount the inner bell inside the outer casing by means of a vibration dampening mounting.

These and other objects of my invention will appear to those skilled in this art from the following description taken together with the drawings, in which Fig. 1 is an elevation with parts in section and with parts broken away;

Fig. 2 is a fragmentary detail of the bell shown in Fig. 1;

Fig. 3 is a section taken on line 3—3, Fig. 2;

Fig. 4 is a section on line 4—4 of Fig. 3;

Fig. 5 is a perspective view of the locking key;

Fig. 6 is a perspective view of one of the vibration dampening washers;

Fig. 7 is an end view of Fig. 1;

Figure 8:
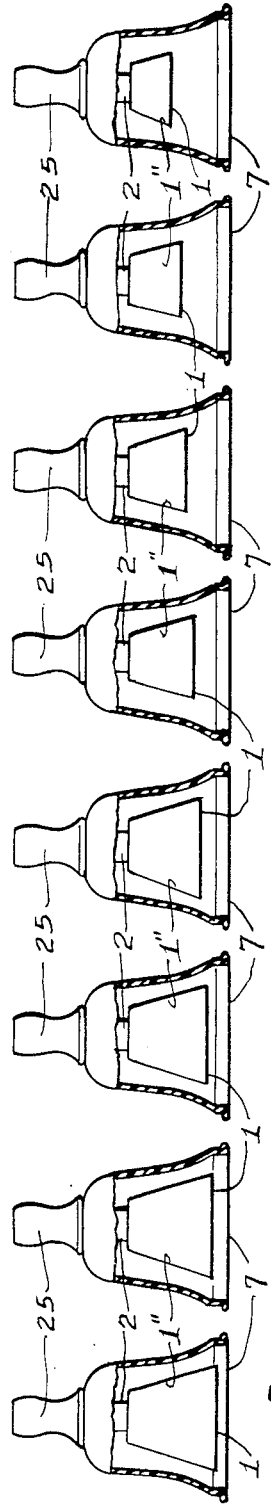
Fig. 8 is a schematic drawing of a series of bells.

The metal bell 1 shown as a wedge-shaped bell, i. e., one whose sides are trapezoidal, is connected at its closed end 1 to metal stem 2 by means of a swedging or any other rigid connection. It will be obvious to those skilled in this art that other bell shapes may be employed. The clapper 5 is swingingly mounted in the eye 4 of the stem 2. The stem is a thin flat bar which at its upper end is cut to form a narrower neck 13 to give two shoulders 12, one on each side of the neck 13. The upper end of the neck 13 is broached or otherwise stamped or pierced to give a rectangular opening 14.

The outer bell-like casing 7 which is illustrated in the drawing is of the conventional cup shape with flared mouth but may be however of any form suitable for resonating or megaphonic amplification of the sound emitted by the bell. It is preferred both for ornamental reasons as well as for purposes of resonating and megaphonically amplifying the sound to make it in the form illustrated in the drawings. Bell 7 is preferably of dimensions to be spaced from the surfaces of the bell 1, and may be made of metal or wood, but is preferably made of plastic or other relatively non-elastic material. The outer bell forms a casing whose closed end 8 is spaced from the end of the bell 1 and the wall 8' of bell 7 is spaced from the wall 1" of bell 1. Thus the bell 1 is entirely encased in the outer bell casing 7 with the end of 1, i. e., the rim of the bell, spaced inwardly from the end of the casing 7. The closed end 8 is formed with end annular recesses or grooves 9 and 10 around a central opening 11 through which the neck 13 passes.

To vibrationally isolate the inner bell 1 from the outer bell shaped casing 7, I provide a resilient or elastic connection, which will dampen any vibrations of the bell which pass up the stem 2 and the neck 13. To accomplish this purpose I provide washers 17 and 17' (see Fig. 6) made of rubber, neoprene or of any similar elastic material. The washer is provided with a rectangular opening 16 to fit over the rectangular neck 13. To mount this washer, I first place a relatively rigid washer 15 made, for example, of plastic carrying a central square opening similar to 16 to fit over the neck 13 and be sealed on the shoulders 12. The washer 15 is provided with three conical projections 19 adjacent its outer periphery on one side of the washer. The rubber washer 17 is seated on the washer 15 so that the conical projections press against the rubber washer 17 for the purposes to be described below.

The rubber washer 17 is seated in the groove 9. A similar rubber washer 17' is entered over the neck 13 and seats in the upper groove 10 and a plastic washer 15' similar to washer 15 also carrying conical projections similar to the projections 19 on the washer 15 is entered over the neck 13 with the conical projections 19 against the rubber washer 17'. The wedging rectangular locking key 20 having rounded corners 21 and a recess 22 centrally located in the upper edge 23 of the key 20 is forced into the opening 14 so the rubber washers 17 and 17' are compressed between the edge 24 and the shoulders 12 by means of the relatively rigid washers 15 and 15'. The projections 19 enter the adjacent faces of the rubber washer, preventing the rubber from being displaced laterally, i. e., from being squeezed out between the faces of the washers 15 and 15' and their complimentary grooves. The rubber washers are thus compressed axially. As the notch 22 enters the opening 14, the compression is relieved in large part but not entirely, leaving the assembly locked in position with the rubber washers in slight compression but with a large part of their resiliency regained by reason of the relief caused by the notch 22.

Thus the stem 2 and the bell rigidly mounted thereon are thus resiliently suspended from the closed end 8 of the outer bell-like casing 7 so that any vibration traveling up the stem 2, transmitted by the bell 1, is damped and absorbed in the rubber washers and not transmitted to the outer bell 7.

When the bell 1 is struck by the clapper 5 the sound generated by the vibration of the body of the bell 1 is transmitted to the column of air which acts as a resonating column which is set in sympathetic vibration and acts also to amplify the sound emitted by the bell 1. The bell 7 acts as a megaphone. The open end bell 1 is spaced inwardly from the open end of 7 so that the end of the bell 1 is encased in the bell 7 for maximum megaphonic effect.

While I do not wish to be bound by any theory of the action of the bell of my invention, I believe the following explanation is correct:

Because the stem 2 need not be tuned so its vibrational characteristics are harmonically related to the periods of vibration of the bell 1 caused by the clapper 5, the vibrations in the stem induced by the energy transmitted from the bell 1 may cause stem 2 to vibrate inharmonically with the bell 1. Since the bell 1 may be tuned to a proper pitch, the inharmonic vibrations of the stem 2 may adversely affect the vibrational characteristics of bell 1 so as to cause it to vibrate at an impure pitch or tone. By damping the upper end of the stem 2 any vibrations induced in the stem 2 are absorbed in the resilient mount and become ineffective to modify the tone of the bell.

Additionally the stem 2 and also the bell 1 are vibrationally effectively isolated from the bell 7, thus the vibration of the rod 2 resulting from the transmission of vibrational energy from the bell 1 is not transmitted to the bell 7.

The sound waves in the air column are therefore influenced substantially entirely by the tuned vibrations of the bell, and are not influenced in any substantial degree by vibrations of the outer bell casing 7 or the stem 2 induced by conduction of the vibrational energy of the bell 1 through stem 2 to the casing. The vibrational energy of the bell is transmitted directly to the air column inside the bell 7 in which column the bell 1 is suspended.

Another feature which aids in isolating any inharmonious vibrations resulting from energy transmitted up the stem 2 results from housing the end of the bar inside the closed hollow handles 25 having a flared end 26 and a hollow core 27 closed by the end 28. The flared end of the hollow handle is placed on the end 10 over the neck 13 and the washer 15' with the neck 13 inside the core 27. The handle may be secured to the bell 7 by means of cement. Due to the shape and thickness of the walls of the handle and the closed end, the handle is substantially rigid and any residual vibrations, if any, transmitted and not damped from the end of 13 are trapped in the hollow handle and not emitted as sound.

It will be observed that the outer bell casing 7 creates a megaphonic chamber around the bell. The bell-shaped casing has a flared mouth. The air column, acting as a megaphone causes an amplification of the bell sound over that obtained by a like bell in open air. This is because of the directional characteristics of the bell 7 which sound louder to the hearer and to be prolonged in time over that obtained from the like bell simultaneously struck in open air.

The outer bell may be designed so that the volume of free air inside the bell 7 and surrounding the bell 1 and the opening is such that its natural frequency is tuned to the pitch of the bell 1 either to its fundamental or to some harmonic or harmonics of the fundamental tone of bell 1. This variation while not essential to obtain the benefits of the megaphonic effect of sound due to the megaphonic action of the bell will, however, be of value in certain cases where such resonance will aid in the production of a pure and strong tone of good timbre, strength and purity. The result is a recurrent sound of fine purity, and of pleasing duration.

In arranging a series of bells constructed according to my invention, tuned to give the various notes of a scale of music, I may employ for each note an outer casing which is proportioned to the bell to give the megaphonic and resonant effects described. I may also employ a casing of the same size and proportions for each bell tuned to the different notes of the scale. In such case the bells become progressively smaller as the notes ascend the scale; for example, from F natural through the octave, e. g., F, G, A, B flat, C, D, E, and F. Thus by employing a stem such as 2 of the same size and configuration and a bell 7 of the same size and shape for each bell, the bell end or rim recedes from the open end of the bell 7 so that the air enclosed in the bell 7 between the bell 1 and 7 becomes less in volume as the bell tone is higher in the scale.

This is illustrated in Fig. 8 which shows somewhat schematically a series of bells tuned to the above scale to show how the resonating air volume decreases as the bell becomes smaller.

Since the fundamental frequency of the bells is greater as the bells ascend in scale, the above arrangement results in a diminution of the resonant air mass to compensate therefor, so that the natural frequency of the resonant chamber be also reduced.

While I have described a particular embodiment of my invention for purposes of illustration, it should be understood that various modifications and adaptations thereof may be made within the spirit of the invention as set forth in the appended claims.

I claim:

1. In combination a bell including a clapper for said bell, an outer casing having a closed end and an open end, said closed end and the walls of said casing being spaced from the surfaces of said first mentioned bell, and means for resiliently connecting the said first mentioned bell to the closed end of said outer casing.

2. In combination, a bell including a clapper for said bell, a stem for said bell rigidly attached to the closed end of said bell, an outer bell-shaped casing having a closed end, and a resilient connection between the said stem and said closed end of said casing.

3. In combination, a bell including a clapper for said bell, a stem for said bell rigidly attached to the closed end of said bell, an outer bell-shaped casing having a closed end, a resilient connection between the said stem and said closed end of said casing, the open end of said first-named bell being spaced inwardly from the open end of said outer bell casing, the closed end and wall of said outer casing being spaced from the closed end and wall of said first-named inner bell.

4. In combination, a bell including a clapper for said bell, a stem for said bell rigidly attached to the closed end of said bell, an outer bell-shaped casing having a closed end, a shoulder on said stem, a resilient washer between said shoulder and the inner wall of said closed end of said outer bell-shaped casing, and means for locking said stem to said closed end.

5. In combination, a bell including a clapper for said bell, a stem for said bell rigidly attached to the closed end of said bell, an outer bell-shaped casing having a closed end, a shoulder on said stem, a relatively rigid washer on said shoulder, a resilient washer positioned on said rigid washer and against the inner surface of the closed end of said outer bell, a resilient washer positioned on said stem with one side of said resilient washer against the outer surface of said outer bell, a second relatively rigid washer on said stem with one side of said rigid washer against the other side of said last-named resilient washer, and a lock key removably passing through said stem and positioned on the other side of said last-named relatively rigid washer.

6. In the combination of claim 5, prongs on each side of said rigid washers extending from the surfaces of said washers into the resilient washers adjacent thereto.

7. In a combination, a bell including a clapper for said bell, a stem for said bell rigidly attached to the closed end of said bell, an outer bell-shaped casing having a closed end, the open end of said first-named bell being spaced inwardly from the open end of said outer bell casing, the closed end and wall of said outer casing being spaced from the closed end and wall of said first-named inner bell, a shoulder on said stem, a relatively rigid washer on said shoulder, a resilient washer positioned on said rigid washer and against the inner surface of the closed end of said outer bell, a resilient washer positioned on said stem with one side of said resilient washer against the outer surface of said outer bell, a second relatively rigid washer on said stem with one side of said rigid washer against the other side of said last-named resilient washer, and a lock key removably passing through said stem and positioned on the other side of said last-named relatively rigid washer.

8. In the combination of claim 6, prongs on each of said rigid washers extending from the surfaces of said washers into the resilient washers adjacent thereto.

9. In combination, a bell including a clapper for said bell, a stem for said bell rigidly attached to the closed end of said bell, an outer bell-shaped casing having a closed end, a shoulder on said stem, a groove in the inner wall of said closed end of said outer bell-shaped casing, a resilient washer in said groove adjacent said shoulder, said stem extending through the closed end of said outer casing, and means exteriorly of said last-mentioned closed end for locking said stem to said closed end of said outer casing.

10. In combination, a bell including a clapper for said bell, a stem for said bell rigidly attached to the closed end of said bell, an outer bell-shaped casing having a closed end, a shoulder on said stem, a groove in the inner wall of said closed end of said outer bell-shaped casing, a resilient washer in said groove adjacent said shoulder, a groove in the outer wall of said closed end of said outer bell-shaped casing, a second resilient washer in said groove, said stem extending through said washers and the closed end of said outer casing, and means exteriorly of said last-mentioned closed end and adjacent said second washer for locking said stem to said closed end of said outer casing.

11. In combination, a bell including a clapper for said bell, a stem for said bell rigidly attached to the closed end of said bell, an outer bell-shaped casing having a closed end, a shoulder on said stem, a relatively rigid washer on said shoulder, a groove in the inner wall of said closed end of said outer bell-shaped casing, a resilient washer positioned in said groove and on said rigid washer, a second groove in the outer wall of said closed end of said outer bell-shaped casing, a second resilient washer positioned on said stem with one side of said second resilient washer disposed in said second groove, a second relatively rigid washer on said stem with one side of said second rigid washer against the other side of said last-named resilient washer, and means for locking said stem to the closed end of said outer casing, said means being positioned on the other side of said last-named relatively rigid washer.

12. In combination a bell including a clapper for said bell, an outer casing having a closed end and an open end, said closed end and the walls of said casing being spaced from the surfaces of said first mentioned bell, and means connecting said first mentioned bell to the closed end of said outer casing, said means damping the vibrations of said bell and vibrationally isolating said bell from said outer casing.

13. In combination a bell including a clapper for said bell, an outer bell-shaped casing having a closed end, the closed end and wall of said outer casing being spaced from the closed end and wall of said first-named inner bell, a connection between the closed ends of said bell and said outer casing, said outer bell-shaped casing being flared at its open end, the open end of said bell being spaced inwardly from the open flared end of said outer casing.

14. The combination as defined in claim 13, wherein said outer bell-shaped casing is composed of a plastic material.

15. In combination a bell including a clapper for said bell, an outer bell-shaped casing having a closed end, the closed end and wall of said outer casing being spaced from the closed end and wall of said first-named inner bell, means connecting said first mentioned bell to the closed end of said outer casing, said means damping the vibrations of said bell and vibrationally isolating said bell from said outer casing, said outer bell-shaped casing being flared at its open end, the open end of said bell being spaced inwardly from the open flared end of said outer casing.

References Cited in the file of this patent

UNITED STATES PATENTS

| 362,970 | Jones | May 17, 1887 |
| 951,611 | Jakobson | Mar. 8, 1910 |
| 1,278,095 | Beckwith | Sept. 10, 1918 |
| 1,528,463 | Yungk | Mar. 3, 1925 |
| 2,649,826 | Van Bergen | Aug. 25, 1953 |

FOREIGN PATENTS

| 232,857 | Germany | Mar. 24, 1911 |